(12) United States Patent
Sikder et al.

(10) Patent No.: US 12,479,431 B2
(45) Date of Patent: Nov. 25, 2025

(54) METHODS AND SYSTEMS FOR ESTIMATING TRAILER TONGUE VALUES

(71) Applicant: GM GLOBAL TECHNOLOGY OPERATIONS LLC, Detroit, MI (US)

(72) Inventors: Tushita Arun Sikder, Windsor (CA); Jackson Barry McGrory, Mississauga (CA); Mohammadali Shahriari, Markham (CA); Ashraf Abualfellat, Grand Blanc, MI (US); Henry Warren Grasman, Flushing, MI (US); Lance G. Lamson, Swartz Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 18/365,851

(22) Filed: Aug. 4, 2023

(65) Prior Publication Data
US 2025/0042400 A1 Feb. 6, 2025

(51) Int. Cl.
*B60W 30/18* (2012.01)
*B60W 40/13* (2012.01)
*B60W 50/14* (2020.01)

(52) U.S. Cl.
CPC ...... *B60W 30/18009* (2013.01); *B60W 40/13* (2013.01); *B60W 50/14* (2013.01);
(Continued)

(58) Field of Classification Search
CPC ........... B60W 30/18009; B60W 40/13; B60W 50/14; B60W 2050/146; B60W 2300/14; B60W 2510/202; B60W 2520/125; B60W 2520/14; B60W 2530/203; B60W 2540/18; B60W 10/04; B60W 10/10; B60W 10/18; B60W 10/20; B60W 10/22; B60W 30/02; B60W 40/10; B60D 1/247; B60D 1/248;
(Continued)

(56) References Cited

U.S. PATENT DOCUMENTS 9,956,965 B1 5/2018 Hall et al.
10,946,710 B2 3/2021 Crooks
(Continued)

FOREIGN PATENT DOCUMENTS

DE 102006049541 A1 4/2008

OTHER PUBLICATIONS

Sindhu, Rahul, Steering Force Calculation, 2019, Skill Lync, https://skill-lync.com/student-projects/Steering-force-calculation-09215 (Year: 2019).*

(Continued)

*Primary Examiner* — Aniss Chad
*Assistant Examiner* — Chase L Cooley
(74) *Attorney, Agent, or Firm* — Ingrassia Fisher & Lorenz, LLP | IF&L

(57) ABSTRACT

Methods and systems are provided for a vehicle towing a trailer. In one embodiment, a method includes: receiving, by a processor, sensor data from one or more sensors of the vehicle; estimating, by a processor, a steering torque value based on the sensor data; estimating, by the processor, a steering angle value based on the sensor data; determining, by the processor, a trailer tongue value based on the steering torque value and the steering angle value; and generating, by the processor, a control signal to control the vehicle based on the trailer tongue value.

20 Claims, 3 Drawing Sheets

(52) U.S. Cl.
CPC ... *B60W 2050/146* (2013.01); *B60W 2300/14* (2013.01); *B60W 2510/202* (2013.01); *B60W 2520/125* (2013.01); *B60W 2520/14* (2013.01); *B60W 2530/203* (2020.02)

(58) Field of Classification Search
CPC .......... B60D 1/62; B62D 53/00; B62D 63/06; B60G 2400/41; B60G 2400/42; B60G 2400/97; B60G 17/0195
See application file for complete search history.

(56) References Cited

U.S. PATENT DOCUMENTS

| | | | |
|---|---|---|---|
| 2006/0206253 A1* | 9/2006 | Yu | B62D 6/002 |
| | | | 701/70 |
| 2015/0165850 A1 | 6/2015 | Chiu et al. | |
| 2015/0323376 A1* | 11/2015 | Cullen | B60D 1/24 |
| | | | 701/124 |
| 2024/0132054 A1* | 4/2024 | Weston | B60W 30/02 |

OTHER PUBLICATIONS

David M. Bevly, Jihan Ryu, and J. Christian Gerdes, Integrating INS Sensors With GPS Measurements for Continuous Estimation of Vehicle Sideslip, Roll, and Tire Cornering Stiffness, IEEE, Transactions on intelligent transportation systems vol. 7, No. 4 (Year: 2006).*

Håvard Fjær Grip, Lars Imsland, Tor A. Johansen, Jens C. Kalkkuhl, and Avshalom Suissa, Vehicle Sideslip Estimation Design, implementation, and experimental validation, 2009, IEEE, Control Systems Magazine (Year: 2009).*

* cited by examiner

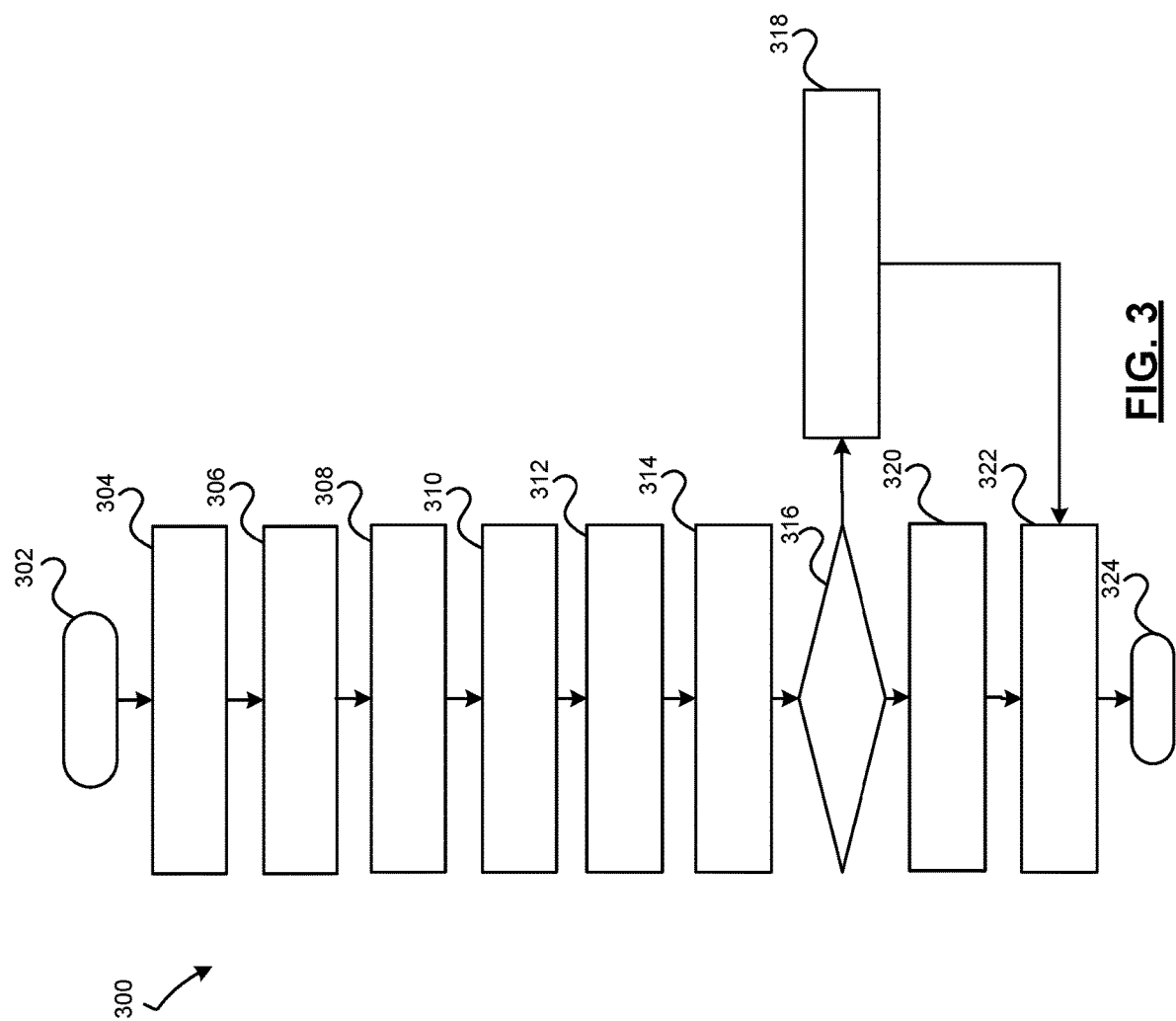

METHODS AND SYSTEMS FOR ESTIMATING TRAILER TONGUE VALUES

INTRODUCTION

The technical field generally relates to vehicles and, more specifically, to methods and systems for determining trailer tongue values while a trailer is coupled to a vehicle and controlling the vehicle based on the determined values.

Trailer tongue load is a measure of the load the trailer tongue exerts on a tow hitch of a vehicle. The trailer tongue load influences lateral vehicle dynamics. When the trailer tongue load is outside of a nominal range, sub-optimal lateral performance of the vehicle can be experienced. Most vehicles are not equipped with a sensor to directly sense the trailer tongue load. Adding additional sensors to directly sense the trailer tongue load increases cost and complexity of the vehicle.

In addition to trailer tongue load, a levelling system may be installed between the vehicle and the trailer to exert a leveling moment on the hitch such that a nose-up effect is not experienced by the vehicle due to a heavy load of the trailer. The effect of the levelling system on the vehicle is referred to as the front axle load restoration. The trailer tongue load and the front axle load restoration affect vehicle dynamics differently and must be configured together to ensure proper vehicle handling.

Accordingly, it is desirable to provide methods and systems for determining trailer tongue values associated with trailer tongue load and front axle load restoration without adding any additional sensors. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for a vehicle towing a trailer. In one embodiment, a method includes: receiving, by a processor, sensor data from one or more sensors of the vehicle: estimating, by a processor, a steering torque value based on the sensor data: estimating, by the processor, a steering angle value based on the sensor data: determining, by the processor, a trailer tongue value based on the steering torque value and the steering angle value; and generating, by the processor, a control signal to control the vehicle based on the trailer tongue value.

In various embodiments, the trailer tongue value is a trailer tongue load value.

In various embodiments, the trailer tongue value is a front axle load restoration value associated with a leveling system.

In various embodiments, the trailer tongue value is a leveling system present value that indicates whether or not a leveling system is present.

In various embodiments, the determining the trailer tongue value is based on a linear model that combines the steering torque value and the steering angle value.

In various embodiments, the steering torque value comprises a steering stiffness coefficient.

In various embodiments, the method includes determining the steering stiffness coefficient based on a lateral acceleration and an applied steering torque from the sensor data.

In various embodiments, the steering angle value comprises an understeer coefficient.

In various embodiments, the determining the understeer coefficient is based on an applied steering angle, a yaw rate, and a lateral acceleration from the sensor data.

In various embodiments, the controlling an automated feature of the vehicle is based on the trailer tongue value.

In various embodiments, the method includes generating display data based on the trailer tongue value.

In another embodiment, a system includes a non-transitory computer readable medium configured to store one or more models that associate trailer tongue values with steering torque values and steering angle values; and a computer system onboard the vehicle. The computer system is configured to, by a processor: receive sensor data from one or more sensors of the vehicle: estimate a steering torque value based on the sensor data: estimate a steering angle value based on the sensor data: determine a trailer tongue value based on the one or more models and the steering torque value and the steering angle value; and generate a control signal to control the vehicle based on the trailer tongue value.

In various embodiments, the trailer tongue value is a trailer tongue load value.

In various embodiments, the trailer tongue value is at least one of a front axle load restoration value associated with a leveling system, and a leveling system present value that indicates whether or not the leveling system is present.

In various embodiments, the computer system is configured to determine the trailer tongue value based on a linear model that combines the steering torque value and the steering angle value.

In various embodiments, the steering torque value comprises a steering stiffness coefficient.

In various embodiments, the computer system is further configured to determine the steering stiffness coefficient based on a lateral acceleration and an applied steering torque from the sensor data.

In various embodiments, the steering angle value comprises an understeer coefficient.

In various embodiments, the computer system is further configured to determine the understeer coefficient based on an applied steering angle, a yaw rate, and a lateral acceleration from the sensor data.

In another embodiment, a vehicle includes a hitch configured to couple to a trailer having a trailer tongue; and a computer system configured to, by a processor: receive sensor data from one or more sensors of the vehicle; estimate a steering torque value based on the sensor data: estimate a steering angle value based on the sensor data: determine a trailer tongue value based on the steering torque value and the steering angle value; and generate a control signal to control the vehicle based on the trailer tongue value.

DESCRIPTION OF THE DRAWINGS

The present disclosure will hereinafter be described in conjunction with the following drawing figures, wherein like numerals denote like elements, and wherein:

FIG. 3 is a flowchart illustrating a process for determining tongue load values as performed by the trailer tongue value

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
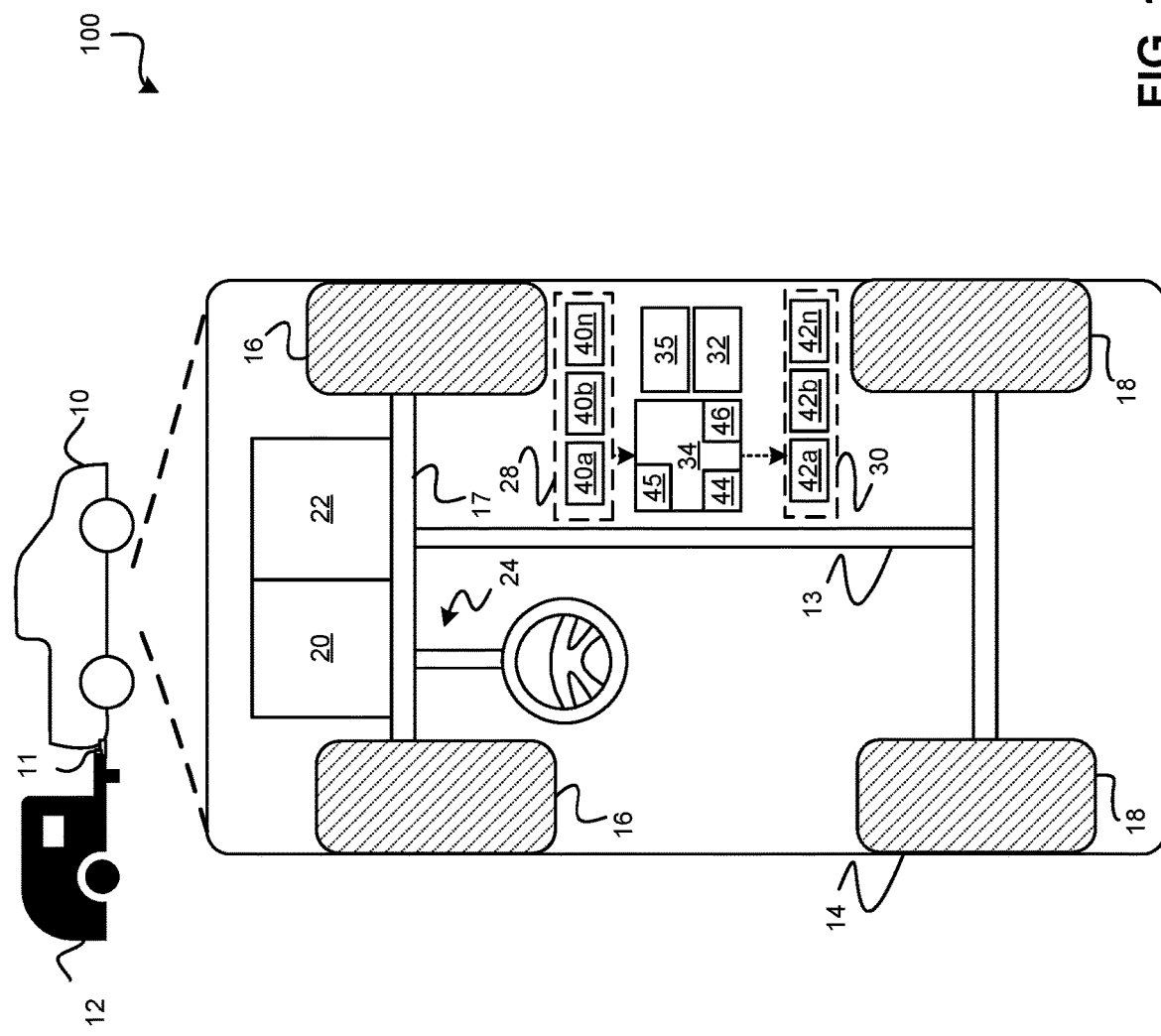
FIG. 1 is a functional block diagram of a vehicle that includes a trailer tongue value estimation system, in accordance with various embodiments.

With reference to FIG. 1, a trailer tongue value estimation system shown generally at 100 is associated with a vehicle 10 in accordance with various embodiments. Generally, the trailer tongue value determination system 100 estimates trailer tongue values, such as trailer tongue load and front axle load restoration, based on steering characteristics estimated while the vehicle 10 is towing a trailer 12. The trailer tongue value determination system 100 estimates the values in a passive manner that does not require any specific driver operation of the vehicle 10. The estimated tongue values are then used in viewing/display, perception, and/or other areas of control of the vehicle 10 such as automated control to coordinate proper vehicle handling.

As shown in FIG. 1, the vehicle 10 comprises an automobile configured to tow the trailer 12. The vehicle 10 may be any one of a number of different types of automobiles, such as, for example, a sedan, a wagon, a truck (as shown), or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile. In various embodiments, the trailer 12 may be any type of towable application having one or more wheels and is not limited to any one embodiment.

The vehicle 10 is configured to couple to and connect to the trailer 12 via a connection apparatus 11 and is configured to tow the trailer 12. In various embodiments, the connection apparatus 11 comprises a hitch mechanism comprising a ball that couples to a tongue of the trailer 12. When coupled to the vehicle 10, the tongue applies a load to the hitch mechanism and thus, the vehicle 10. This load is hereby referred to as the trailer tongue load. In various embodiments, a levelling system including levelling bars may be installed between the hitch of the vehicle 10 and the tongue of the trailer 12. When installed, the levelling system exerts a leveling moment on the hitch mechanism in an effort to level the vehicle 10. The leveling moment is hereby referred to as the front axle load restoration. In various embodiments, the connection apparatus 11 further comprises a wiring harness configured to communicate power and/or communication signals to and from components of the trailer 12.

As depicted in FIG. 1, the exemplary vehicle 10 generally includes a chassis 13, a body 14, front wheels 16, rear wheels 18, and a suspension system 19. The body 14 is arranged on the chassis 13 and substantially encloses components of the vehicle 10. The body 14 and the chassis 13 may jointly form a frame. The wheels 16-18 are each rotationally coupled to the chassis 13 through the suspension system 19 near a respective corner of the body 14 and an axle 17.

The vehicle 10 further includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the components of the vehicle itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trailer tongue value determination system 100 and, when executed by the processor 44, receive data from the sensor system 28 and process the received data in order to determine a trailer tongue values such as trailer tongue load and front axle load restoration (FALR). For example, the instructions process sensor data in order to determine steering characteristics such as a steering torque applied to achieve a lateral acceleration, and a steering angle applied to follow a curve. The instructions determine the trailer tongue values by correlating the steering characteristics with a trailer longue load value and a front axle load restoration value based on one or more linear models that combine the characteristics. The instructions control the vehicle 10 based on the estimated trailer tongue values.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
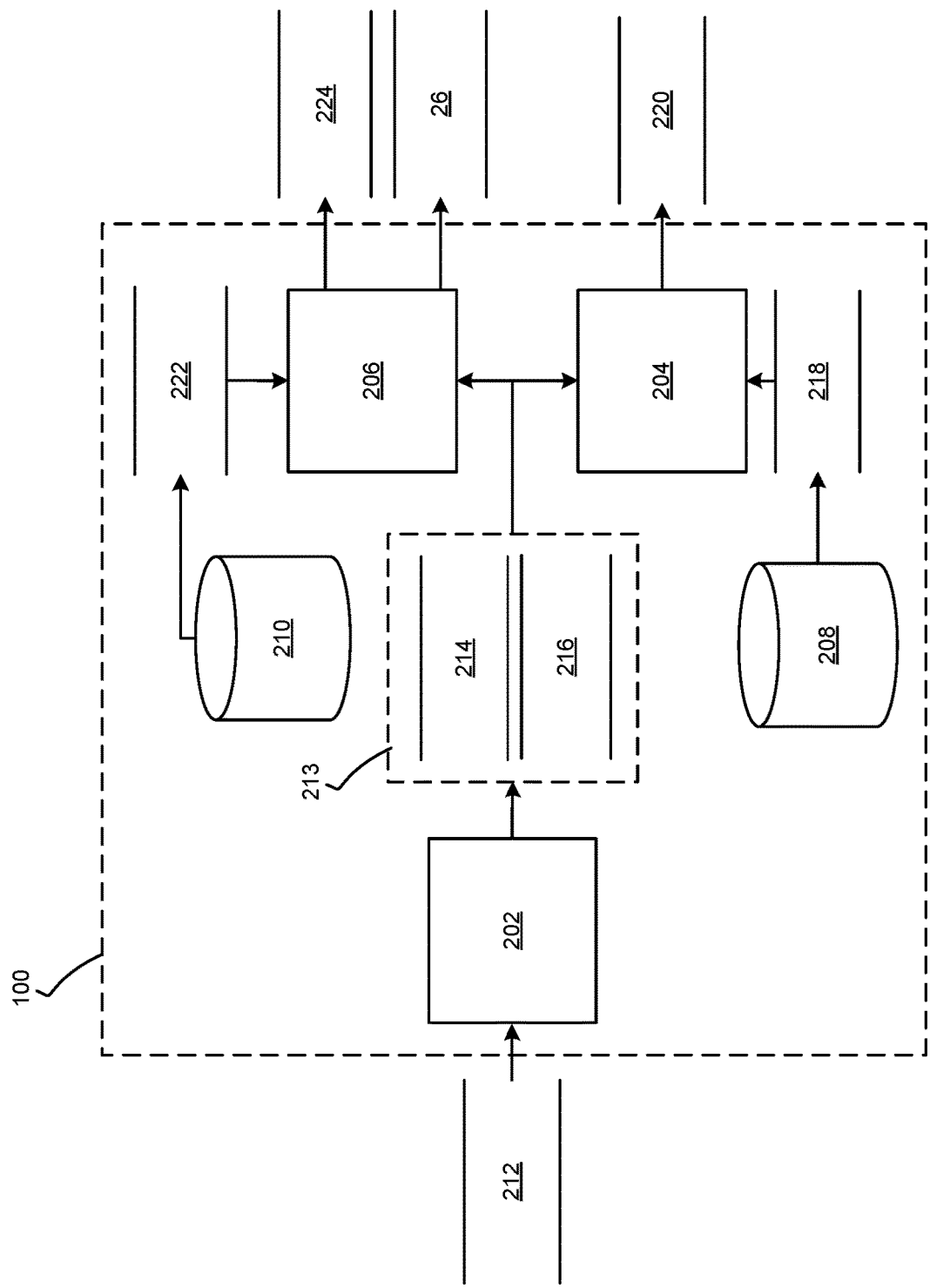
FIG. 2 is a dataflow diagram illustrating elements of the trailer tongue value estimation system of the vehicle of FIG. 1, in accordance with various embodiments.

With reference to FIG. 2 and with continued reference to FIG. 1, a dataflow diagram illustrates elements of the trailer tongue value determination system 100 of FIG. 1 in accordance with various embodiments. As can be appreciated, various embodiments of the trailer tongue value determination system 100 according to the present disclosure may include any number of modules embedded within the controller 34 which may be combined and/or further partitioned to similarly implement systems and methods described herein. Furthermore, inputs to the trailer tongue value determination system 100 may be received from the sensor system 28, received from other control modules (not shown) associated with the vehicle 10 and/or the trailer 12, and/or determined/modeled by other sub-modules (not shown) within the controller 34 of FIG. 1. In various embodiments, the trailer tongue value determination system 100 includes a steering characteristics determination module 202, a tongue load determination module 204, and a front axle load restoration determination module 206, and one or more model datastores 208, 210. The model datastores 208, 210 store one or more models used for determining trailer tongue values as will be discussed in more detail below.

In various embodiments, the steering characteristics determination module 202 receives as input sensor data 212. The sensor data 212 can include, for example, inertia measurement unit (IMU) data, wheel speed sensor (WSS) data, electric power steering (EPS) data, and/or side angle slip (SAS) data. The steering characteristics determination module 202 estimates steering values 213 associated with characteristics of the steering system such as the torque applied to achieve a lateral acceleration, and the steering angle applied to follow a curve and generates steering torque data 214 and steering angle data 216 based thereon.

In various embodiments, the steering characteristics determination module 202 determines the steering torque value as a steering stiffness value based on lateral acceleration and applied steering torque (e.g., total torque equals driver torque plus motor torque) derived from the sensor data 212 and using a linear relationship. In various embodiments, the steering characteristics determination module 202 determines the steering angle value based on applied steering angle, measured yaw rate, and lateral acceleration derived from the sensor data 212 and using a linear relationship. As can be appreciated, the steering values 213 can be determined using other sensor data and/or other models as the disclosure is not limited to the present examples.

In various embodiments, the tongue load determination module 204 receives as input the steering torque data 214, and the steering angle data 216. The tongue load determination module 204 determines the trailer tongue load based on the received data 214, and 216 and generates trailer tongue load data 220. In various embodiments, the tongue load determination module 204 determines the trailer tongue load based on a linear model defined by tongue load model data 218 that combines the steering torque data 214 and the steering angle data 216 and that is retrieved from the model datastore 208. For example, the tongue load determination module 204 determines the trailer tongue load using the relationship:

$$TL = a_0 + a_1 K_{us} + a_2 K_s,$$

where TL represents trailer tongue load, $K_{us}$ represents understeer coefficient, $K_s$ represents steering stiffness coefficient, and $a_0$, $a_1$, and $a_2$ represent linear model parameters that may be implemented as constant calibrations.

In various embodiments, the front axle load restoration determination module 206 receives as input the steering torque data 214, and the steering angle data 216. The front axle load restoration determination module 206 determines the front axle load restoration based on the received data 214, and 216 and generates front axle load restoration data 223. In various embodiments, the front axle load restoration determination module 206 determines the front axle load restoration based on a linear model defined by front axle load restoration model data 222 that combines the steering torque data 214 and the steering angle data 216 and that is retrieved from the model datastore 210. For example, the front axle load restoration determination module 206 determines the front axle load restoration using the relationship:

$$FALR = b_0 + b_1 K_{us} + b_2 K_s,$$

where FALR represents the front axle load restoration, $K_{us}$ represents understeer coefficient, $K_s$ represents steering stiffness coefficient, and $b_0$, $b_1$, $b_2$ represent linear model parameters that may be implemented as constant calibrations.

In various embodiments, the front axle load restoration determination module 206 determines whether the leveling system is present based on the determined value of the front axle load restoration. For example, when the FALR value is equal to or substantially equal to a zero value, the front axle load restoration determination module 206 determines that the leveling system is not present and generates leveling system present data 226 to indicate such based thereon. When the FALR value is not equal to or not substantially equal to zero, the front axle load restoration determination module 206 determines that the leveling system is present and generates leveling system present data 226 to indicate such based thereon.

In various embodiments, the trailer tongue load data 220, the front axle load restoration data 224, and the leveling system present data 226 are then used by the control system or other vehicle system for use in automated control of the vehicle 10, and/or as trailer data display. For example, the trailer tongue values can be provided as a load value in newtons, a percent load of a maximum load, or as an image or display affect representing the load value and/or percent.

With reference now to FIG. 3 and with continued reference to FIGS. 1-2 a flowchart provides a method 300 for determining trailer tongue values and controlling a vehicle 10 based thereon, in accordance with exemplary embodiments. As can be appreciated in light of the disclosure, the order of operation within the method 300 is not limited to the sequential execution as illustrated in FIG. 3 but may be performed in one or more varying orders as applicable and in accordance with the present disclosure. In various embodiments, the method 300 can be scheduled to run based on one or more predetermined events, and/or can run continuously during operation of the vehicle 10.

In one example, the method 300 may begin at 302. Sensor data is received at 304 and pre-processed at 306. For example, the sensor data may be evaluated for quality and/or synchronized as discussed above. Thereafter, the steering characteristics are estimated based on the pre-processed sensor data at 308 and 310. For example, the steering torque value, such as the steering stiffness coefficient, is estimated based on applied steering torque and lateral acceleration at 308; and the steering angle value, such as the understeer coefficient, is estimated based on steering angle, yaw rate, and lateral acceleration at 310.

The tongue load value is determined from a linear model that combines the estimated steering characteristics at 312. The FALR value is determined from a linear model that combines the estimated steering characteristics at 314 and evaluated at 316. As can be appreciated, one or more filtering methods may be applied to the estimated values to remove any measurement uncertainties at 312 and 314. When the FALR value is equal to zero, levelling system present data is generated that indicates no leveling system is present at 318. When the FALR value is not equal to zero, levelling system present data is generated that indicates a leveling system is not present at 320.

Thereafter, the vehicle 10 is controlled in some manner, for example, by displaying information, providing perception information, and/or controlling other actuators based on the trailer tongue load value and/or the FALR values at 322. The method 300 may end at 324.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a vehicle towing a trailer, comprising:
   receiving, by a processor, sensor data from one or more sensors of the vehicle, wherein the sensor data includes an applied steering torque and an applied steering angle;
   detecting, by an inertial measurement unit, a lateral acceleration and a yaw rate;
   estimating, by the processor, a steering torque value based on the applied steering torque and the lateral acceleration;
   estimating, by the processor, an understeer coefficient based on a linear relationship between the applied steering angle, the yaw rate and the lateral acceleration;
   determining, by the processor, a trailer tongue value based on the steering torque value and the understeer coefficient, wherein the trailer tongue value is a percent of a maximum trailer tongue load; and
   controlling, by the processor, the vehicle based on the trailer tongue value and the understeer coefficient.

2. The method of claim 1, wherein the trailer tongue value is a load value provided in newtons.

3. The method of claim 1, wherein the trailer tongue value is a front axle load restoration value associated with a leveling system.

4. The method of claim 1, wherein the trailer tongue value is a leveling system present value that indicates whether or not a leveling system is present.

5. The method of claim 1, wherein the determining the trailer tongue value is based on a linear model that combines the steering torque value and the steering angle value.

6. The method of claim 1, wherein the steering torque value comprises a steering stiffness coefficient.

7. The method of claim 6, further comprising determining the steering stiffness coefficient based on a lateral acceleration and an applied steering torque from the sensor data.

8. The method of claim 1, wherein the understeer coefficient is determined by a steering characteristics determination module in response to the applied steering angle, the yaw rate and the lateral acceleration.

9. The method of claim 1, further including a front axle load restoration determination module configured to generate a front axle load restoration data in response to the understeer coefficient and a steering stiffness coefficient.

10. The method of claim 1, further comprising controlling an automated feature of the vehicle based on the trailer tongue value, wherein the automated feature of the vehicle includes a vehicle handling control algorithm.

11. The method of claim 1, further comprising generating display data based on the trailer tongue value.

12. A system for a vehicle towing a trailer, comprising:
   a non-transitory computer readable medium configured to store one or more models that associate trailer tongue values with steering torque values and steering angle values; and
   a computer system onboard the vehicle and configured to, by a processor:
      receive sensor data from one or more sensors of the vehicle, wherein the sensor data includes an applied steering torque and an applied steering angle;
      detecting, by an inertial measurement unit, a lateral acceleration and a yaw rate;
      estimate a steering torque value based on the applied steering torque and the lateral acceleration;
      estimate an understeer coefficient based on a linear relationship between the applied steering value, the yaw rate and the lateral acceleration;
      determine a trailer tongue value based on the one or more models and the steering torque value and the understeer coefficient, wherein the trailer tongue value is a percent of a maximum load; and
      control the vehicle in response to the trailer tongue value and the understeer coefficient.

13. The system of claim 12, wherein the trailer tongue value is a load value provided in newtons.

14. The system of claim 12, wherein the trailer tongue value is at least one of a front axle load restoration value associated with a leveling system, and a leveling system present value that indicates whether or not the leveling system is present.

15. The system of claim 12, wherein the computer system is configured to determine the trailer tongue value based on a linear model that combines the steering torque value and the steering angle value.

16. The system of claim 12, wherein the steering torque value comprises a steering stiffness coefficient.

17. The system of claim 16, wherein the computer system is further configured to determine the steering stiffness coefficient based on a lateral acceleration and an applied steering torque from the sensor data.

18. The system of claim 12, wherein the understeer coefficient is determined by a steering characteristics determination module in response to the applied steering angle, the yaw rate and the lateral acceleration.

19. The system of claim 18, wherein the computer system is further configured to generate, by a front axle load restoration determination module, a front axle load restoration data in response to the understeer coefficient and a steering stiffness coefficient.

20. A vehicle, comprising:
   a hitch configured to couple to a trailer having a trailer tongue; and
   a computer system configured to, by a processor:
      receive sensor data from one or more sensors of the vehicle, wherein the sensor data includes an applied steering torque and an applied steering angle;
      detecting, by an inertial measurement unit, a lateral acceleration and a yaw rate;
      estimate a steering torque value based on the applied steering torque and the lateral acceleration;
      estimate an understeer coefficient based on a linear relationship between the applied steering value, the yaw rate and the lateral acceleration;
      determine a trailer tongue value based on the steering torque value and the understeer coefficient, wherein the trailer tongue value is a percent of a maximum load; and
      control the vehicle based on the trailer tongue value and the understeer coefficient.

* * * * *